J. M. JAY.
Horse Rake.
No. 47,371.
Patented April 18, 1865.
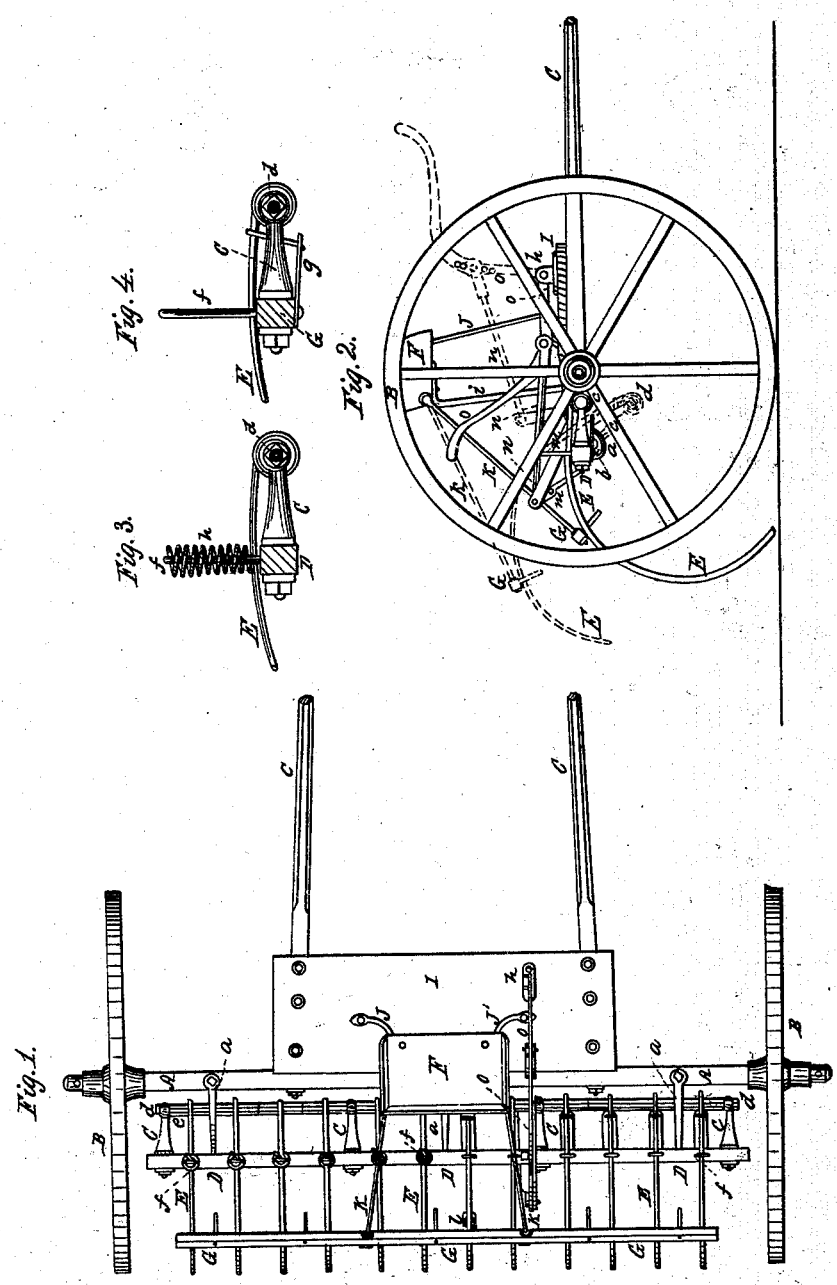
Witnesses:
Inventor:

UNITED STATES PATENT OFFICE.

JAMES M. JAY, OF CANTON, OHIO, ASSIGNOR TO W. H. ALEXANDER & CO., OF SAME PLACE.

IMPROVEMENT IN HORSE-RAKES.

Specification forming part of Letters Patent No. 47,371, dated April 18, 1865.

*To all whom it may concern:*

Be it known that I, JAMES M. JAY, of Canton, in the county of Stark and State of Ohio, have invented certain new and useful Improvements in Horse Hay-Rakes; and I do hereby declare the following to be a full, clear, and exact description of the construction and operation of the same, reference being had to the accompanying drawings, making a part of this specification, in which—

Figure 1 represents a top plan of the machine. Fig. 2 represents a side elevation with the several parts shown in their working and in their raised-up position, shown in black and in red lines, respectively. Figs. 3 and 4 represent detached views of the detail of the machine, which will be more specially referred to in the specification.

Similar letters of reference, where they occur in the separate figures, denote like parts of the machine in all the drawings.

My invention relates to the combination of the swinging bar, rake-head, and S-shaped hangers, so that the bar, when the rake is raised up, will swing into one of the curves of the hangers and the rake-head into the other curve, as and for a purpose to be hereinafter explained.

The axle A is supported in two supporting-wheels, B B, to which the shafts C are firmly attached at its front. To this axle are attached hangers *a a a*, extending rearward and downward, to the extreme lower ends of which is connected a bar, D, by dead-eyes *b*, so that said bar may freely swing or hinge on said hangers when desired.

To the bar D are connected arms *c*, which extend toward the front of the machine, and sustain a rod or shaft, *d*, on which the rake tines or fingers E are secured by sleeves, bosses, or ferrules *e*, to which the tines may be fastened, or between which they may be held, these sleeves when on the rod being tightened up and held by nuts or otherwise on the ends of the rod *d*, which rod constitutes the rake-head. The tines or fingers E pass from the rod to which they are attached through loops or guides *f*, arranged on the bar D, and flat springs, as at *g*, Fig. 4, or spiral springs *h*, as at Fig. 3, are so connected with them as to hold them down upon the bar, but yet allow them to yield when striking or passing over any obstructions or inequalities in the ground to prevent them from being bent or broken.

The driver's seat F is supported partially upon the axle A by a brace, *i*, and partially on the foot-board I by braces *j*, said foot-board being fastened to the shafts C, so as to brace and strengthen them. From the seat F two rods or braces, *k*, (one at each side thereof,) extend rearward and downward, to which the comb or clearer G is attached for stripping the hay from the tines when they are raised up to drop the hay in the windrow, and to keep this clearer G in working position with regard to the rake it may have a loop, *l*, at or near its center, (or more than one,) through which one of the tines may pass.

A rigid arm, *m*, fastened to the bar D extends upward therefrom and slightly inclined in a rearward direction, to which a connecting-rod, *n*, is pivoted, that extends forward and has its forward end pivoted to a bent lever, *o*, that is hinged at *p* to the foot-board I, and to which lever it may be so adjusted by means of the series of holes therein as to hug the tines more or less closely to the ground or to bring them more or less under the machine. A brace, *r*, also extends from the end of the arm *m* and connects with the rake head or rod *d*. By this arrangement of arm, connecting-rod, lever, and brace the driver from his seat may, by seizing the end of the lever *o*, raise up the rake to allow the gathered hay to be left in the windrow, or for moving the machine from place to place, or for turning around, and when raised up to its full extent the several parts will assume the position shown by the red lines in Fig. 2. When the rake is let down upon the ground, the connections or joints of the connecting-rod *n* with the lever and the lever with the foot-board are such, or in such positions, that they permanently hold the rake to the ground without any other fastening.

The hangers *a* are shaped somewhat like the letter S, so that the rake-head *d* may swing into one of its curves and the bar D swing into the other one, and thus the whole may be arranged in a very compact and neat form, and the tines or rake is thus balanced, or partially so, or indeed may be overbalanced, if desirable, to facilitate the raising of it when loaded with the gathered hay to deliver the hay upon the ground in good condition. In addition to the reversed-curved shape of the hangers *a* for the purposes stated, they have lugs for fitting over and under the axle, so that a perpendicular through-bolt may securely fasten them to the axle.

Having thus fully described my invention, what I claim therein as new, and desire to secure by Letters Patent, is—

In combination with the bar D and rake-head *d*, the S-shaped hangers *a*, so arranged that the bar will swing into one of the curves of the hanger and the rake-head into the other, substantially as and for the purpose described.

JAMES M. JAY.

Witnesses:
 HENRY KEHR,
 W. W. CLARK.